United States Patent [19]

Lomneth et al.

[11] 4,388,339

[45] Jun. 14, 1983

[54] MARGARINE AND METHOD FOR MAKING SAME

[75] Inventors: Richard B. Lomneth; Daniel R. Blair, both of Cincinnati; Gary L. Parnell, Forest Park; Bernard Y. Tao, Cincinnati, all of Ohio

[73] Assignee: The Procter & Gamble Company, Cincinnati, Ohio

[21] Appl. No.: 318,163

[22] Filed: Nov. 4, 1981

[51] Int. Cl.$^3$ ............................ A23D 3/00; A23D 5/00
[52] U.S. Cl. ..................................... 426/602; 426/603; 426/607
[58] Field of Search ............... 426/602, 603, 604, 606, 426/607

[56] References Cited

U.S. PATENT DOCUMENTS

| Re. 30,086 | 8/1979 | Carlile et al. | 426/603 |
|---|---|---|---|
| 2,772,976 | 12/1956 | Schmidt et al. | 426/603 |
| 2,973,269 | 2/1961 | Melnick | 426/603 |
| 3,189,465 | 6/1965 | Oakley et al. | 426/603 |
| 3,488,199 | 1/1971 | Gander et al. | 426/603 |
| 3,634,100 | 1/1972 | Fondu et al. | 426/607 |
| 3,706,576 | 12/1972 | Caverly et al. | 426/607 |
| 3,859,447 | 1/1975 | Sreenivasan | 426/604 |
| 3,889,011 | 6/1975 | Read | 426/604 |
| 3,949,105 | 4/1976 | Wieske et al. | 426/604 X |
| 4,055,679 | 10/1977 | Kattenberg et al. | 426/607 |
| 4,087,564 | 5/1978 | Poot et al. | 426/603 |
| 4,205,095 | 5/1980 | Pike et al. | 426/607 |

FOREIGN PATENT DOCUMENTS

| 650481 | 2/1951 | United Kingdom . |
|---|---|---|
| 765870 | 1/1957 | United Kingdom . |
| 827172 | 2/1960 | United Kingdom . |

OTHER PUBLICATIONS

Bailey's Industrial Oil and Fat Products, (3rd Ed., 1964), pp. 326-330.
Haighton, "Blending, Chilling, and Tempering of Margarines and Shortenings", J. Am. Oil Chemists' Soc., Jun. 1976, (vol. 53), pp. 397-399.
Wiedermann, "Margarine & Margarine Oil, Formulation & Control", J. Am. Oil Chemists' Soc., (vol. 55), pp. 823-829.

*Primary Examiner*—Robert A. Yoncoskie
*Attorney, Agent, or Firm*—Eric W. Guttag; Michael J. Roth; Rose Ann Dabek

[57] ABSTRACT

A margarine or other emulsified spread and methods for making these are disclosed. A water-in-oil emulsion is formed by mixing an aqueous base with an oil phase containing a margarine fat which comprises a soft oil and a structural fat having a unique melting profile and triglyceride composition. The emulsion is chilled to a temperature of from about 15° F. (−9° C.) to about 45° F. (7° C.) over a time period of at least about 0.5 minutes. The chilled emulsion is then crystallized over a time period of at least about 3 minutes. Due to heat generated during crystallization, the crystallized emulsion is preferably chilled further to a temperature of from about 15° F. (−9° C.) to about 40° F. (4° C.) over a time period of at least about 0.2 minutes. For stick-type products, the combination of chilling the emulsion to cooler temperatures together with longer residence times for crystallization provides spreads having sufficient viscosity to form stick-type products with conventional margarine equipment. This emulsified spread is characterized by a slump grade of at least 8 after one hour at 80° F. and a Hot Probe value of at least about 11.3 (°F./6 sec.).

18 Claims, 15 Drawing Figures

MARGARINE AND METHOD FOR MAKING SAME

TECHNICAL FIELD

The present application relates to water-in-oil emulsified spreads, such as margarines and methods for making same.

BACKGROUND ART

Emulsified fat spreads, in particular margarines, provide certain consumer benefits, notably in taste properties. One important consumer benefit is its mouth texture. Factors which contribute to mouth texture are cooling impact, mouthmelt, and mouthfeel (cleanup). A preferred emulsified spread provides a significant cooling impact, a rapid, sharp melt sensation, and no coated or waxy feel on the tongue. Another important consumer benefit is the temperature cycling stability of the spread. During normal usage, margarines are repeatedly taken in and out of the refrigerator and are thus exposed to a frequent cycle of warmer and colder temperatures. Also, during storage and shipment, the spread can be subjected to temperature variation. Such temperature cycling can affect the properties of the spread, especially mouth texture. Preferred emulsified spreads will have temperature cycling stability, i.e. the ability to withstand temperature variation without significant adverse effects on its properties.

The spread should also satisfy certain consumer requirements. One important consumer requirement is spreadability. The spread should be sufficiently plastic so as to be easy to spread on softer foods such as bread or toast. Another more important consumer requirement, especially for stick-type products, is heat stability or resistance to slump. The spread should not lose its shape (slump) upon exposure to room temperatures for the period of time during which the spread is used. Preferred emulsified spreads will maximize the benefits of mouth texture and temperature cycling stability while at the same time satisfying the consumer requirements for spreadability and heat stability.

The emulsified spread normally used as the yardstick for all others, especially with regard to mouth texture, is butter. In standard butter manufacture, cream is separated from milk by centrifugation and then ripened to develop its flavor properties. The ripened cream is then churned at a temperature of from about 48° F. (8.5° C.) to 60° F. (15.5° C.). After churning, the buttermilk is drained off and the butter washed with water. The washed butter is worked and then packaged as tubs, cubes or prints. In a continuous process for making butter, the cream is heated to melt the fat completely with separation of the heated material to increase the fat content to above 80%. The higher fat material is reconstituted with milk, water, salt and color, and then emulsified, solidified in a continuous chiller, worked and packaged similar to standard margarine manufacture. See *Bailey's Industrial Oil and Fat Products* (3rd Ed. 1964), pp. 326–330.

Butter has a particularly pleasing mouth texture. The cooling impact on the tongue is significant and the mouthmelt rapid and sharp with no coated or waxy mouthfeel. The heat stability of butter is also adequate. However, refrigerated butter can be quite hard in consistency, especially after temperature cycling, and therefore difficult to spread on softer foods such as bread or toast. Thus, butter does not always satisfy the consumer requirements desired for emulsified spreads.

To improve the spreadability of the emulsified spread while still trying to approximate the mouth texture of butter, workers in the art have developed various margarines. One factor important to the spreadability and mouth texture of a margarine is the margarine fat used. These margarine fats need sufficient solids content to provide heat stability to the margarine at room temperature yet have sufficient plasticity to be spreadable when refrigerated. Such fats often contain a soft oil high in polyunsaturated fatty acids (linoleic and linolenic) such as safflower oil or sunflower oil. Also, blends of fats and oils are frequently used to formulate margarine fats.

Margarine fats are usually made from triglycerides which have predominantly long chain length fatty acids (e.g. palmitic, stearic, oleic and/or linoleic residues). These long chain fatty acid triglycerides can be interesterified to provide margarine fats having different melting profiles. See for example, U.S. Pat. No. Re. 30,086 to Carlisle et al, issued Aug. 28, 1979 (margarine fat consisting essentially of randomized palm oil); U.S. Pat. No. 3,889,011 to Read, issued June 10, 1975 (margarine fat containing palm oil or cottonseed oil co-randomized with soybean or sunflower oil); U.S. Pat. No. 3,634,100 to Fondu et al, issued Jan. 11, 1972 (margarine fat containing liquid oil such as sunflower or safflower and co-randomized blend of coconut oil, palm oil and palm stearine); U.S. Pat. No. 3,859,447 to Sreenivasan, issued Jan. 7, 1975 (margarine fat containing oils high in linoleic acid content such as sunflower oil and safflower oil which have been interesterified). More typically, the long chain fatty acid triglyceride is a hydrogenated (hardened) oil. See *Bailey's Industrial Oil and Fat Products, supra*, at page 339. Hydrogenation increases the solid content of the oil (more saturated triglycerides and conversion of at least some of the cis double bonds of the unsaturated fatty acid residues to trans double bonds), thus increasing the heat stability of margarine.

The spreadability, mouth texture, and to a lesser extent, the heat stability of the margarine can be affected by the processing conditions. In standard margarine manufacture, the aqueous phase ingredients (milk or milk solids, salt, flavors, preservatives and water) are dispersed in the oil phase (melted margarine fat, emulsifiers, color and flavors) and the mixture then sent through a scraped wall heat exchanger known as an A unit. Besides chilling the emulsified fat, the high local pressure and shearing action of the A unit induces fast nucleation and crystallization during the short residence time (ca. 5 to 10 seconds). The chilled emulsion is then sent to a crystallizer known as a B unit. Static B units in the form of a hollow pipe or resting tube normally provide firmer, stick-type margarines. Working B units in the form of picker boxes which serve to break up the larger fat crystals into smaller ones, normally provide softer, tub-type margarines. Because fats require crystallization times of 5 to 7 minutes (ca.), the residence time in the B unit is significantly longer than that of the A unit. The number and order of A and B units can be varied depending upon the characteristics desired for the margarine. See Haighton, "Blending, Chilling, and Tempering of Margarines and Shortenings", *J. Am. Oil Chemists Soc.*, Vol. 53 (June, 1976), pp. 397–399 (especially flow diagram in FIG. 7); Wiedermann, "Margarine and Margarine Oil, Formulation and Control", *J. Am. Oil Chemists Soc.*, Vol. 55 (Dec. 1978), pp. 823–829 (especially flow diagram in FIG. 5).

Most commercial margarines are sufficiently plastic when refrigerated to have satisfactory spreadability and have sufficient solids content to provide adequate heat stability at room temperature. However, commercial margarines, especially those containing hydrogenated oils, having mouthmelting properties which are flat or "thick" in character and leave a waxy or coated mouthfeel. Also, the temperature impact on the tongue does not provide the cooling sensation of butter. Thus commercial margarines lack the mouth texture of butter.

A number of methods have been developed which purport to formulate margarines having rapid mouthmelt properties. One example is U.S. Pat. No. 2,973,269 to Melnick, issued Feb. 28, 1961, which relates to a method for making a margarine product by super chilling the emulsion and then working the super-chilled emulsion to dissipate heat due to fat crystallization. In this method, one or more hydrogenated vegetable oils such as cottonseed or soybean oil are mixed with aqueous ingredients and then sent through one or more A units which discharge the emulsion at a temperature of from about 35° F. (1.5° C.) to 63° F. (17° C.) (more usually about 40° F. [4.4° C.] to 60° F. [15.5° C.]). The super-chilled emulsion is then sent to a working B unit where its temperature increases to about 50° F. (10° C.) to 73° F. (22.5° C.), preferably about 55° F. (12.5° C.) to 72° F. (22° C.). Preferably, the margarine discharged from the B unit is sent through another A unit which discharges the margarine at a temperature of from about 35° F. (1.5° C.) to 63° F. (17° C.).

Another example is disclosed in U.S. Pat. No. 3,488,199 to Gander et al, issued Jan. 6, 1960, which relates to a process for preparing a margarine product in which part of the fat is precrystallized. Referring to FIG. 1, a portion of the fat is mixed with aqueous ingredients at emulsifying pump 3 to form chiefly an oil-in-water emulsion. The remainder of the fat is cooled in A unit 13 to a temperature of less than 20° C. (68° F.), precrystallized in B unit 14 and then sent through two A units 15 and 16. The precrystallized fat from A units 15 and 16 at a temperature of about 5° C. to 20° C. (41° F. to 68° F.) is blended with the emulsion from pump 3 having a temperature of from 17° C. to 23° C. (45° F. to 64° F.) and then mixed in B unit 4. See also U.S. Pat. No. 2,772,976 to Schmidt et al, issued Dec. 4, 1956, which discloses a method for making a margarine product wherein the emulsion is precrystallized and then further chilled in two A units to a temperature of 40° F. (4° C.) prior to mixing with additional aqueous ingredients to form the ultimate margarine product.

Single fractionated or "topped" palm oil fats have also been used in formulating margarine products to improve mouth texture. U.S. Pat. No. 3,189,465 to Oakley et al, issued June 15, 1965 relates to a "cool tasting" margarine wherein at least a major proportion of the fat phase consists of one or more lower melting fractions of a semi-soft oil. These lower melting fractions can be obtained by a single thermal fractionation in which the higher melting fraction containing substantially all the trisaturated glycerides is removed. A representative example of such a fat phase consists of about 60 to 70% topped palm oil, about 15 to 25% lard (whole or topped), with the remaining fat being ground nut oil. Margarines formulated with the liquid fraction from a single thermal fraction of palm oil do not satisfy the consumer requirements for heat stability in a stick-type product. Also, margarines made from topped palm oil are extremely brittle and difficult to spread. See also U.S. Pat. No. 4,055,679 to Kattenberg et al, issued Oct. 25, 1977 (plastic fat suitable for margarines containing a palm-based fat such as palm olein co-randomized with fats such as soybean oil or safflower oil); U.S. Pat. No. 4,087,564 to Poot et al, issued May 2, 1978 (olein fraction obtained by single thermal fraction of co-randomized blend of palm oil and soybean oil).

Double fractionated palm oil fats are also known in the art as cocoa butter substitutes and extenders. One example is disclosed in U.S. Pat. No. 4,205,095 to Pike et al, issued May 27, 1980, which relates to a thermal fraction method for producing a palm mid-fraction suitable as a cocoa butter substitute or extender. Refined, bleached palm oil is heated (70°–75° C.) and then immediately cooled (28°–33° C.) to form a first liquid fraction (iodine value 55–60) and a first solid fraction (iodine value 38–44 and melting point 50°–55° C.). The first liquid fraction is separated, heated (60°–65° C.) and then immediately cooled (14°–17° C.) to produce a second liquid fraction (iodine value 59–64) and the desired palm mid-fraction (iodine value 48–53 and melting point 32°–36° C.) which is disclosed as having about 83% by weight symmetrical mono-unsaturated triglycerides and asymmetrical di-unsaturated triglycerides combined. The palm mid-fraction is separated and then hydrogenated to an iodine value of 38–45 to provide a hydrogenated palm mid-fraction having a melting point of 33°–36° C.

Another such example is disclosed in British Patent Specification No. 827,172 to Best et al, published Feb. 3, 1960, which relates to a method for making a cocoa butter substitute by a two-step solvent fractionation of palm oil.

It is an object of the present invention to provide a margarine or other emulsified spread having a desirable mouth texture and temperature cycling stability.

It is another object of the present invention to provide a margarine or other emulsified spread having satisfactory spreadability and heat stability, especially for stick-type products.

It is yet another object of the present invention to provide a margarine or other emulsified spread which provides consumer benefits in terms of mouth texture and temperature cycling stability while at the same time satisfying consumer requirements for spreadability and heat stability.

It is yet a further object of the present invention to provide a margarine which can be made from double thermally fractionated palm oil.

These and further objects of the present application are hereinafter disclosed.

DISCLOSURE OF THE INVENTION

The present application relates to novel margarines and other water-in-oil emulsified spreads, especially stick-type products. These emulsified spreads provide a desirable mouth texture in terms of cooling impact, mouthmelt and mouth feel. These spreads also have temperature cycling stability such that the spread can be taken in and out of the refrigerator without significant adverse effects on the properties thereof, especially mouth texture. These spreads also satisfy consumer requirements for spreadability and heat stability for stick-type products. In addition, these spreads provide improved baking performance in the preparation of baked goods such as cakes.

To form the margarine or other water-in-oil emulsified spread, water containing flavorings, etc. is mixed with oil containing coloring, flavor, etc. to form an emulsion. The emulsion is chilled to a temperature of from about 15° F. (−9° C.) to about 45° F. (7° C.) over a time period of at least about 0.5 minutes. The chilled emulsion is then crystallized over a time period of at least about 3 minutes. Due to the heat generated during crystallization, the crystallized emulsion is preferably chilled further to a temperature of from about 15° F. (−9° C.) to about 40° F. (4° C.) over a time period of at least about 0.2 minutes. For stick-type products, the combination of chilling the emulsion to cooler temperatures together with longer residence times for crystallization provides spreads having sufficient viscosity to form stick-type products with conventional margarine equipment.

The oil phase used in formulating margarines and other emulsified spreads according to the present application contains a particular margarine fat. This margarine fat can comprise from about 30 to about 65% by weight of the oil phase of a soft oil and from about 35 to about 70% by weight of the oil phase of a structural fat consisting essentially of:

(a) from about 3% to about 9% by weight SSS triglycerides;
(b) from about 32% to about 50% by weight SOS triglycerides;
(c) from about 5% to about 12% by weight SSO triglycerides; and
(d) from about 20% to about 32% by weight SOO/SLS triglycerides, wherein S=saturated $C_{16}$ or $C_{18}$ fatty acid residue, O=oleic acid residue, and L=linoleic acid residue;

said fat having a weight ratio of P:St acid residues attached to the glycerides of greater than 8.5 and a weight ratio of O:L acid residues of from about 4 to about 5, wherein P=palmitic, St=stearic, O=oleic, and L=linoleic.

This margarine oil product is characterized by a melting profile, as measured by a Solid Fat Content of:
(a) from about 17 to about 54% at 50° F. (10° C.);
(b) from about 6 to about 33% at 70° F. (21° C.);
(c) from about 4 to about 16% at 80° F. (26.6° C.);
(d) from about 2 to about 7.5% at 92° F. (33.3° C.); and
(e) less than 2% at 105° F. (40.5° C.).

In terms of Fatty Acid Composition, the weight ratio of P:St acid residues attached to the glycerides is about 3.4 to about 7.5 while the weight ratio of O:L acid residues is about 0.4 to about 2.2, wherein P=palmitic, St=stearic, O=oleic, and L=linoleic.

The spread has an 80° F. slump grade of greater than 8 at one hour and a Hot Probe value at least about 11.3 (°F./6 sec.). The slump grade indicates thermal stability and the Hot Probe value indicates the cooling impact of the spread.

Definitions

The term "water-in-oil emulsion" refers to a composition characterized by dispersion of water as discrete droplets in a continuous oil phase.

The term "emulsified spread" refers to a solid or plastic water-in-oil emulsion. Such spreads can contain from about 50% to about 90% margarine oil product.

The term "stick-type product" normally refers to an emulsified spread product in the form of a rectangular solid, usually having a length of about 5 inches and a cross-sectional thickness of 1¼ inch square.

The term "margarine" refers to an emulsified spread characterized by an oil phase of at least about 80% by weight of the spread. Thus, margarines have an aqueous phase of up to about 20% by weight of the spread.

The term "low fat content spread" refers to an emulsified spread, other than a margarine. Low fat content spreads have an oil phase of less than about 80% by weight of the spread.

The term "fat" refers to a triglyceride composition characterized by a solid or plastic consistency at room temperatures, e.g. at about 70° F.

The term "oil" refers to a triglyceride composition characterized by a fluid or liquid consistency at room temperatures, e.g. at about 70° F.

The terms "margarine oil product" and "margarine fat" refer to the structural fat and soft oil blend used in the oil phase of an emulsified spread.

The term "structural fat" refers to the unique fat of this invention which provides heat stability to the emulsified spread and stabilizes the emulsion.

The designations "SSS, SOS or SLS, SSO and SOO" refer to trisaturated, symmetrical mono-unsaturated, symmetrical diunsaturated, asymmetrical mono-unsaturated and asymmetrical di-unsaturated triglycerides, respectively.

The designations "C48, C50, C52 and C54" refer to the total number of carbon atoms of the combined fatty acid residues attached to the glyceride. Thus, a "C48 triglyceride" will yield on hydrolysis three fatty acid residues which have a combined total of 48 carbon atoms.

The designation of fatty acids throughout the specification are P=palmitic, St=stearic, O=oleic, L=linoleic, S=saturated fatty acid, U=unsaturated fatty acid, $C_{16}$ fatty acid is palmitic, $C_{18}$ fatty acid is stearic. When S=$C_{16}$ or $C_{18}$, the triglyceride SSS can be tripalmitin, tristearin, 1,3-dipalmitylstearin, 1,2-dipalmitylstearin, 1,3-distearylpalmitin or 1,2-distearylpalmitin.

Structural Fat

Figure 1:
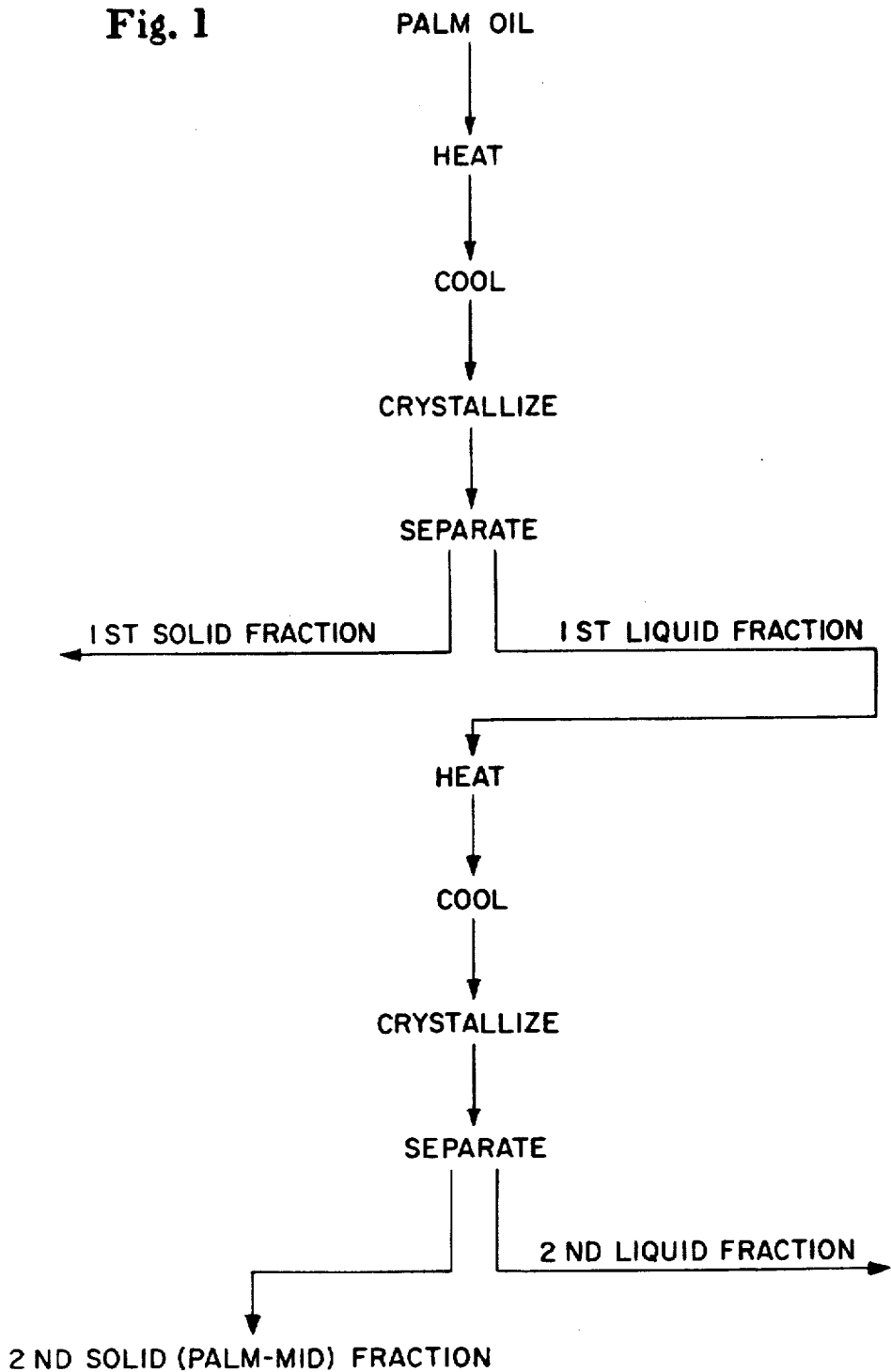
FIG. 1 represents a flow diagram of a preferred method for making the structural fat of the present invention.

A. Composition of Structural Fat.

1. Triglyceride Composition.

The structural fat of the present invention has a unique triglyceride composition.

The triglyceride composition in terms of positional isomers can be determined by Argentation thin layer chromatography (hereafter Argentation). Argentation uses silver nitrate as a complexing reagent in a chromatographic separation. The triglycerides separate according to the degree of unsaturation and the position of the fatty acid on the triglyceride molecule. However, chain length of the saturated fatty acids cannot be determined by this method. For example, Argentation can be used to distinguish SSS, SSO and SOS triglycerides, but cannot be used to distinguish POSt, POP, and StOSt triglycerides. The specific Argentation method used to determine the triglyceride composition of the structural fat of the present application is described under the section entitled "Analytical Methods for Determining Triglyceride Composition of Structural Fat".

From Argentation, it has been determined that the structural fat comprises:
(a) from about 3 to about 9% by weight SSS triglycerides;
(b) from about 32 to about 50% by weight SOS triglycerides;
(c) from about 6 to about 12% by weight SSO triglycerides; and
(d) from about 20 to about 32% by weight SOO/SLS triglycerides, wherein S=saturated $C_{16}$ or $C_{18}$ fatty acid residue, O=oleic acid residue and L=linoleic acid residue. Argentation also indicates that up to about 24% by weight other compounds mainly in the form of other positional isomer triglycerides (e.g. OOO, OOL, SLL, SLO), plus mono- and di-glycerides, can be present in the structural fat. Preferred structural fats for stick-type products have the following Argentation values:

| Triglycerides | % By Weight |
|---|---|
| SSS | from about 4 to about 7.0 |
| SOS | from about 35 to about 46 |
| SSO | from about 7.7 to about 10.2 |
| SOO/SLS | from about 23 to about 29.5 |

By comparison, cocoa butter and cocoa butter substitutes and extenders have higher levels (at least about 70-80% by weight) of SOS triglycerides.

2. Fatty Acid Composition

Another parameter used to define the triglyceride composition of the structural fat is the Fatty Acid Composition (hereafter FAC), especially the weight ratio of P:St acid residues attached to the glycerides and the weight ratio of O:L acid residues. The P:St ratio is about 8.5 or higher, and preferably ranges from about 9 to about 10. The O:L ratio is about 3.5 or higher, and preferably ranges from about 4 to about 5. By comparison, cocoa butter has an P:St ratio of at least about 1, and usually from 0.70 to 0.75.

The structural fat usually has an FAC of:
(a) from about 44 to about 55% by weight palmitic (P) acid residues;
(b) from about 4.5 to about 5.5% by weight stearic (St) acid residues;
(c) from about 31 to about 40% by weight oleic (O) acid residues;
(d) from about 6 to about 9.5% by weight linoleic (L) acid residues.

Up to about 3% by weight of other fatty acid residues (e.g. myristic) can also be present. The FAC of preferred structural fats used for stick-type margarine products is as follows:

| Fatty Acid | % by Weight |
|---|---|
| palmitic (P) | from about 47.5 to about 54 |
| stearic (St) | from about 4.5 to about 5.5 |
| oleic (O) | from about 34 to about 38 |
| linoleic (L) | from about 6.5 to about 9.5 |

The FAC for a particular triglyceride composition can be obtained by the method described under the section entitled "Methods for Determining Triglyceride Composition of Structural Fat."

By combining the results from Argentation, CNP and FAC the triglyceride composition of the structural fat can be obtained. It is believed that the predominant SOS and SSS triglycerides of the structural fat are 2-oleo-1,3-dipalmitan (POP) and tripalmitin (PPP), respectively. The unique triglyceride composition of this structural fat should be compared to that of typical cocoa butter and cocoa butter substitutes or extenders. The triglycerides of cocoa butter and cocoa butter substitutes or extenders are predominantly in the form of 2-oleo-1-stearin-3-palmitin (StOP) (about 40% by weight for cocoa butter) with lesser amounts of 2-oleo-1,3-distearin (StOSt) and 2-oleo-1,3-dipalmitin (POP) (cocoa butter has about 20% by weight of each).

3. Melting Profile.

An important characteristic of the structural fat of the present application is its unique melting profile. The solids content of the fat at a particular temperature can be given in terms of a Solid Fat Content value (hereafter SFC value). An SFC value provides a reasonably accurate approximation of the percent by weight solids of the fat at a given temperature. By determining SFC values at a number of different temperatures, a melting profile of the fat can be obtained. The fat of the present application can have an SFC of:
(a) from about 67 to about 80% at 50° F. (10° C.);
(b) from about 31 to about 58% at 70° F. (21° C.);
(c) from about 12 to about 39% at 80° F. (26.6° C.);
(d) from about 4 to about 18% at 92° F. (33.3° C.); and
(e) about 7% or less at 105° F. (40.5° C.).

Preferred structural fats for stick-type products have an SFC of:
(a) from about 71 to about 77% at 50° F. (10° C.);
(b) from about 33 to about 48% at 70° F. (21° C.);
(c) from about 18 to about 28% at 80° F. (26.6° C.);
(d) from about 6 to about 13% at 92° F. (33.3° C.); and
(e) about 3% or less at 105° F. (40.5° C.).

Before determining SFC values, the fat sample is heated to a temperature of 158° F. or higher for at least 0.5 hours or until the sample is completely melted. The melted sample is then tempered at a temperature of 40° F. for at least 72 hours. After tempering, the SFC value of the fat at a particular temperature can be determined by pulsed nuclear magnetic resonance (PNMR). The method for determining SFC values of a fat by PNMR is described in Madison and Hill, *J. Amer. Oil Chem. Soc.*, Vol. 55 (1978), pp. 328-31 (herein incorporated by reference.)

4. Carbon Number Profile.

Another parameter used to identify the triglyceride composition of the structural fat is its Carbon Number Profile (hereafter CNP). The CNP indicates the percentage of triglycerides having a certain number of carbon atoms for the combined fatty acid residues attached to the glyceride. The structural fat has a CNP of:

(a) from about 5 to about 12% by weight C48 triglycerides;
(b) from about 40 to about 55% by weight C50 triglycerides;
(c) from about 23 to about 35% by weight C52 triglycerides; and
(d) from about 5 to about 10% by weight C54 triglycerides.

CNP also indicates that up to about 12% by weight other compounds mainly in the form of mono- and di-glycerides can be present in the structural fat. The CNP of preferred structural fats for stick-type products is as follows:

| Carbon No. | % by Weight |
|---|---|
| 48 | from about 7.5 to about 9.5 |
| 50 | from about 43 to about 50 |
| 52 | from about 26 to about 33 |
| 54 | from about 7 to about 9 |

The CNP for a particular triglyceride composition can be obtained by the method described under the section entitled "Methods for Determining Triglyceride Composition of Structural Fat".

5. Iodine Value.

The structural fat of the present invention has an iodine value (hereafter IV) in the range of from about 39 to about 50 and preferably from about 42 to about 48. By comparison, cocoa butter and cocoa butter substitutes and extenders usually have an IV of about 35 or less. The IV of a fat or oil indicates the number of grams of iodine equivalent to halogen adsorbed by a 100 g. sample. Because the halogen adsorbence is due to the double bonds present in the fatty acid residues attached to the glycerides, the IV of a fat or oil can give a general indication of solids content at a given temperature. As the fatty acid residues become more saturated, the fat or oil increases in solids content. In general, the lower the IV of a given fat or oil, the greater will be the solids content at a given temperature. The IV of a fat or oil can be determined by A.O.C.S. Official Method Cd 1-25, known as the Wijs method.

6. Methods for Determining Triglyceride Composition of Structural Fat.

a. Argentation

The positional isomer triglyceride composition of a fat can be determined by Argentation Thin Layer Chromatography. 20 cm. square, 250 micron layer thickness, silica gel H plates (Analtech, Newark, Del.) are sprayed with a 2.5% solution of silver nitrate until evenly wet. These plates are then activated in a forced-air oven for 60 minutes at 115° C. and stored in a dark enclosure until cool.

Solutions of the individual fat samples are prepared at two concentrations (in chloroform): dilute (5.0 mg./ml.) to better quantitate the major glyceride components and concentrated (50 mg./ml.) to better quantitate the trace components. Analytical standard solutions are prepared for spotting alongside the fat samples of interest. These standards contained equal amounts of tristearin, oleo-distearin, dioleo-palmitin, 2-oleo-1,3-distearin, and 3-oleo-1,2-distearin, each at 1 mg./ml. concentration. Samples of each individual fat solution are then spotted at 10 microg. and 100 microg. concentrations alongside analytical standards which are spotted at 1, 2, 4 and 8 microg. for each component. A secondary standard of African cocoa butter at concentrations the same as the fat solution is also spotted. After the spotting solution solvent (chloroform) evaporates, the plates are ready for development.

Each analytical plate is developed at room temperature in a darkened chamber with 85% methylene chloride, 15% toluene, 0.1% acetic acid developing solvent until the solvent reaches a prescribed line (17 cm. from the origin). The developing solvent is allowed to evaporate in a forced nitrogen chamber for 10 minutes.

Each plate is then sprayed evenly with a 25% sulfuric acid solution and placed on a 21 cm. square by 0.3 cm. thick aluminum plate atop a hot plate. The plate is heated from 25° C. to 230° C. over a period of 105 minutes.

After cooling to room temperature, the individual fat sample is then quantitatively scanned versus the spotted standards in a Camag densitometer set at 600 nm. The individual scans are integrated by a Spectraphysics SP-4100 integrator and calibration curves are prepared from the spotted standards for quantitation purposes. At least 4 (usually 6) samples for each fat are used to determine mean SSS, SOS, SSO and SOO/SLS triglyceride levels.

b. Carbon Number Profile.

The CNP of a particular triglyceride composition can be determined by programmed temperature-gas chromatography using a short fused silica column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three C16 (palmitic) fatty acid residues will co-elute with triglycerides made up of one C14 (myristic), one C16 and one C18 (stearic) fatty acid residue or with a triglyceride composed of two C14 fatty acid residues and one C20 (arachidic) fatty acid residue.

Preparation of the fat sample for analysis is as follows: 1.0 ml. of a tricaprin internal standard solution (2 mg./ml.) is pipetted into a vial. The methylene chloride solvent in the standard solution is evaporated using a steam bath under a nitrogen stream. Two drops of the fat sample (20 to 40 mg.) are pipetted into the vial. If the fat sample is solid, it is melted on a steam bath and stirred well to insure a representative sample. 1.0 ml. of bis (trimethylsilyltrifluoroacetamide) (BSTFA) is pipetted into the vial which is then capped. The contents of the vial are shaken vigorously and then placed in a heating block (temperature of 100° C.) for about 5 minutes.

For determining the CNP of the prepared fat sample, a Hewlett-Packard 5880A series gas chromatograph equipped with temperature programming and a hydrogen flame ionization detector is used together with a Hewlett-Packard 3351B data system. A 2 m. long, 0.22 mm. diameter fused silica capillary column coated with a thin layer of methyl silicone (Chrompak CP-SIL 5) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

| Septum purge | 1 ml./min. |
|---|---|
| Inlet pressure | 5 psi |
| Vent flow | 75 ml./min. |
| Makeup carrier | 30 ml./min. |
| Hydrogen | 30 ml./min. |
| Air | 400 ml./min. |

1.0 microl. of the prepared fat sample is taken by a gas-tight syringe and injected into the sample port of the gas chromatograph. The components in the sample port are warmed up to a temperature of 365° C. and swept by a helium carrier gas to push the components into the column. The column temperature is initially set at 175° C. and held at this temperature for 0.5 minutes. The column is then heated up to a final temperature of 355° C. at a rate of 25° C./min. The column is maintained at the final temperature of 355° C. for an additional 2 minutes.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number ($C_N$) according to the following equation:

$$\%C_N = (\text{Area of } C_N/S) \times 100$$

wherein S = sum of Area of $C_N$ for all peaks generated

The Area of $C_N$ is based upon the actual response generated by the chromatograph multiplied by a response factor for glycerides of the particular Carbon Number. These response factors are determined by comparing the actual responses of a mixture of pure glycerides of various Carbon Numbers to the known amounts of each glyceride in the mixture. A glyceride generating an actual response greater than its actual amount has a response factor less than 1.0; likewise, a glyceride generating a response less than that of its actual amount has a response factor of greater than 1.0. The mixture of glycerides used (in a methylene chloride solution) is as follows:

| Component | Carbon No. | Amount (mg./ml.) |
|---|---|---|
| palmitic acid | 16 | 0.5 |
| monopalmitin | 16 | 0.5 |
| monostearin | 18 | 0.5 |
| dipalmitin | 32 | 0.5 |
| palmitostearin | 34 | 0.5 |
| distearin | 36 | 0.5 |
| tripalmitin | 48 | 1.5 |
| dipalmitostearin | 50 | 1.5 |
| distearopalmitin | 52 | 1.5 |
| tristearin | 54 | 1.5 | c. Fatty Acid Composition.

The FAC of a particular triglyceride composition can be determined by gas chromatography performed on the corresponding methyl esters. The fatty acid residues attached to the glycerides are converted to the respective methyl esters and injected directly into the gas chromatograph where the components are separated by carbon atom chain length and degree of unsaturation. The peak areas for each methyl ester can be determined either graphically or electronically.

Prior to gas chromatographic analysis of the fat sample, the fatty acid residues attached to the glyceride are converted to the respective methyl esters. Fifty ml. of sodium methoxide reagent (3 g. of sodium per 1. of methanol) is added to 10–15 g. of the fat sample. This mixture is boiled with stirring for 3–5 minutes. After boiling, 25 ml. of saturated NaCl-0.5% HCl solution is added to the mixture. After addition of the NaCl-HCl solution, 50 ml. of hexane is added. The mixture is then mixed and the hexane layer decanted through filter paper containing about 5 g. of anhydrous sodium sulfate. The filtered hexane is evaporated to obtain the methyl esters.

To determine the FAC of the prepared fat sample, a Hewlett-Packard 5712A series gas chromatograph equipped with temperature programming and a thermal conductivity detector is used together with a Hewlett-Packard 7123A recorder and a Hewlett-Packard 3351B data system. A 10 ft. long, ¼ inch diameter stainless steel column packed with a preconditioned packing of 10% DEGS-PS on 100/120 Chromosorb WHP is also used. The column is heated in an oven where temperature can be controlled. The thermal conductivity detector is attached to the outlet port of the column. The signal generated by the detector is amplified by an electrometer into a working input signal for the data system and recorder. The recorder prints out the gas chromatograph curve and the data system electronically integrates the area under the curve.

The following instrument conditions are used with the gas chromatograph:

| Detector | 300° C. |
|---|---|
| Carrier gas flow | 60 ml./min. |

One microl. of the prepared fat sample is taken by a gas-tight syringe and injected into the sample port of the gas chromatograph. The components in the sample port are warmed up to a temperature of 300° C. and swept by a helium carrier gas to push the components into the column. The column temperature is held at 215° C.

The chromatographic peaks generated are then identified and the peak areas measured. Peak identification is accomplished by comparison to known pure methyl esters previously programmed into the data system. The peak area as determined by the data system is used to determine the percentage of the particular fatty acid ($C_N$) according to the following equation:

$$\% C_N = \frac{(\text{Area of } C_N)(\sqrt{\text{Molecular Weight of } C_N})}{S} \times 100$$

wherein $S$ = sum of (Area of $C_N$) ($\sqrt{\text{Molecular Weight of } C_N}$) of all peaks generated B. Method for Making Structural Fat.

A preferred method for obtaining the structural fat is by a solventless, two-step thermal fractionation of palm oil. FIG. 1 represents a flow diagram of this preferred method. Basically, palm oil is melted and then slowly cooled to produce a first solid fraction which is then separated from a first liquid fraction. This liquid fraction is heated and then cooled to form or crystallize a desired second solid, palm mid-fraction which is then separated from the second liquid fraction.

Referring more specifically to FIG. 1, whole (unfractionated) palm oil (iodine value of from about 50 to about 55) is used as the starting material. This whole palm oil has preferably been refined and bleached (RB), or refined, bleached and deodorized (RBD). The whole palm oil is heated or melted to insure an essentially crystal-free homogeneous oil mixture. Heating to a temperature of at least about 140° F., and typically within a temperature range of from about 150° F. to about 170° F., for at least about 0.5 hours, provides such a crystal-free mixture. During heating, the palm oil is typically agitated to make the mixture homogeneous.

The heated palm oil is then slowly cooled, preferably under gentle agitation, to a temperature of from about 75° F. to about 95° F. and more preferably a temperature of from about 80° F. to about 85° F. The rate of cooling depends upon several factors such as the amount of palm oil, the amount of agitation and the diglyceride concentration in the palm oil. The cooling rate is usually about 20° F./hr. or less, and preferably about 10° F./hr. or less. The palm oil is maintained at this cooler temperature for a period of time sufficient to permit crystallization (or solidification) of a first solid fraction (stearine fraction) having an iodine value of from about 42 to about 47. The amount of time necessary to complete this first separation depends upon various factors, including the configuration of the crystalizer, the rate at which the palm oil is cooled, the quantity of palm oil (larger quantities increase crystallization time), and the amount of agitation (which decreases crystallization time). For example, this first crystallization is usually complete after a holding time of at least about 10 hours for smaller quantities of about 20 lbs. or less, and at least about 48 hours for larger quantities of about 100 lbs. or more. The first solid fraction is then separated, usually by filtration (e.g. using a vacuum drum filter), from a first liquid fraction (first olein fraction) having an iodine value of from about 56 to about 61.

The separated first liquid fraction is then heated to insure an essentially crystal-free, homogeneous mixture. Usually, this first liquid fraction is heated to a temperature of at least about 140° F. and more typically to a temperature within the range of from about 150° F. to about 170° F., for at least about 0.5 hours to provide the crystal-free mixture. During heating, this first liquid fraction is typically agitated to make the mixture homogeneous.

The heated first liquid fraction is then slowly cooled, preferably with gentle agitation, to a temperature of from about 50° F. to about 80° F., and more preferably to a temperature of from about 60° F. to about 75° F. The rate of cooling of the first liquid fraction is dependent upon the amount of agitation. The cooling rate is usually about 20° F./hr. or less, and more preferably about 10° F./hr. or less. The second solid fraction crystallizes or precipitates from the liquid phase.

In one embodiment of this second crystallization, the first liquid fraction is maintained at the cooler temperature for at least about 12 hours (preferably at least about 24 hours, more preferably at least about 48 hours for larger quantities of 100 lbs. or more) to permit complete crystallization or formation of the desired second solid fraction (palm mid-fraction) having an iodine value of from about 39 to about 50, and preferably from about 42 to about 48. This second solid fraction is then separated, usually by filtration (e.g. using a vacuum drum filter) and then centrifugation, from a second liquid fraction (second olein fraction) which has an iodine value of from about 58 to about 63. It is particularly desirable to separate as much as possible of the second liquid fraction from the second solid fraction to provide preferred structural fats, especially for use in stick-type margarine products. This second solid fraction can be used (preferably after being deodorized) as the structural fat, or else can be blended with a minor amount of the second liquid fraction to vary the melting profile and triglyceride composition of the structural fat.

A second embodiment of this second crystallization involves temperature cycling wherein the first liquid fraction is held at the cooler temperature to crystallize out the second solid fraction with subsequent heating to enable better separation and yield of this solid fraction from the second liquid fraction. The particular conditions of temperature cycling can depend upon various factors, including the configuration and heat transfer characteristics of the crystallizer. For example, the first liquid fraction can be held at a temperature of from about 70° F. to 80° F. for at least about 5 hours (preferably at least about 24 hours for larger quantities of about 100 lbs. or more), cooled to a temperature of from about 55° F. to about 65° F. (preferably from about 55° F. to about 60° F.) for at least about 5 hours (preferably at least about 24 hours for larger quantities of about 100 lbs. or more) and then fairly slowly heated to and held at the original temperature range of from about 70° F. to about 80° F. for at least about 5 hours (preferably at least about 24 hours for larger quantities of about 100 lbs. or more). After this temperature cycling, the second solid fraction which crystallizes out is separated from the second liquid fraction as in the first embodiment.

Other methods can also be used to form the structural fat. One such method involves blending a fat containing a high proportion of POP triglycerides with an oil containing a low proportion of such triglycerides. Examples of fats having high levels of POP triglycerides include Stillingia tallow, fats prepared according to Example II of U.S. Pat. No. 3,808,245 to O'Connor et al, issued Apr. 30, 1974, and fats prepared according to Example II of U.S. Pat. No. 3,809,711 to Yetter, issued May 7, 1974. Examples of oils low in POP triglycerides include the second liquid fraction from thermal fraction of palm oil. The fats and oils are blended so as to provide a structural fat having the SFC, Argentation, CNP and FAC values previously defined in the section entitled "Composition of Structural Fat".

Margarines and Other Emulsified Spreads.

A. Composition of Margarine or Other Emulsified Spread.

1. Oil phase ingredients.

a. Margarine Oil Product.

The main component of the oil phase is the margarine fat. In addition to the structural fat, the margarine fat contains one or more soft oils. Suitable soft oils have SFC values of:

(a) about 1% or less at 50° F.; and (b) 0% at 70° F.

The SFC values are determined by heating the soft oil to 140° F. for at least 20 minutes, tempering the heated oil at 32° F. for at least 5 minutes, further tempering the soft oil at 80° F. for at least 30 minutes, and measuring the solids content of the tempered oil by PNMR as in the case of the structural fat. Suitable soft oils can be derived from animal, vegetable or marine sources, including naturally occurring oils such as cottonseed oil, soybean oil, sunflower oil, corn oil, peanut oil, safflower oil, and the like. Soft oils preferably used are safflower oil, sunflower oil, soybean oil and blends thereof. Soft oils high in solids content such as palm oil or hydrogenated soft oils usually need to be winterized to provide suitable soft oils having the above defined SFC values.

Natural soybean oil has an IV which can vary from about 110 and about 150 with an average value of about 130. Soybean oil can be partially hydrogenated to prevent flavor deterioration caused by the more highly unsaturated components such as the triglycerides having linolenic acid residues. The partial hydrogenation of soybean oil can be achieved by any of a number of art recognized techniques, all of which involve contacting the oil with gaseous hydrogen in the presence of a catayst such as nickel and/or copper. See, e.g. *Bailey's Industrial Oil and Fat Products, supra*, pp. 793 et seq. This partially hydrogenated soybean oil is winterized to remove solids to provide a soft oil having an IV of from about 110 to about 115. See, e.g., *Bailey's Industrial Oil and Fat Products, supra*, pp. 1007 et seq. for winterization techniques. It is also desirable that the soft oil, e.g. partially hydrogenated and winterized soybean oil, be refined, bleached and deodorized in accordance with conventional practice. See, e.g., *Bailey's Industrial Oil and Fat Products, supra*, pp. 719 et seq. and 897 et seq.

The structural fat in an amount of from about 35% to about 70% of the oil phase is blended with the soft oil in an amount of from about 30% to about 65% by weight of the oil phase. The amount of structural fat and soft oil used affects the physical properties in the spread. Increased levels of soft oil impart better cooling impact and spreadability to the spread. Increased levels of structural fat impart better heat stability to the spread. Tub-type spreads typically have higher levels of soft oil while stick-type spreads typically have higher levels of structural fat.

For stick-type spreads, the structural fat in an amount of from about 35% to about 70% by weight of the oil phase is blended with the soft oil in an amount of from about 30 to about 65% by weight of the oil phase. More typically, the amount of structural fat ranges from about 40 to about 55% by weight while the amount of soft oil ranges from about 45 to about 60% by weight. Margarine oil products for stick-type spreads have SFC values of:

(a) from about 17% to about 54% at 50° F.;
(b) from about 6% to about 33% at 70° F.;
(c) from about 4% to about 16% at 80° F.;
(d) from about 2% to about 7.5% at 92° F.; and
(e) less than 2% at 105° F.

Margarine oil products having much lower SFC values normally have insufficient heat stability. By contrast, margarine oil products having much higher SFC values normally have too little mouth cooling impact, especially upon temperature cycling.

The palmitic to stearic acid weight ratio of the margarine fat ranges from about 3.4 to about 7.5. The oleic to linoleic acid weight ratio ranges from about 0.4 to about 2.2. The exact value is dependent on the particular soft oil used.

Besides the structural fat and soft oil, the margarine oil product can include minor amounts of other fats and oils. Soft oils which have high solids content are included within the term "other fats and oils". Examples of such fats and oils include palm oil and interesterified oils or blends of various oils, either by random or directed interesterification. Examples of oils which can be interesterified either alone or by appropriate blending are palm oil, sunflower oil and safflower oil. Fats or oils high in lauric acid, such as hydrogenated or unhydrogenated coconut oil, palm kernel oil and babassu oil, are usually included only in tub-type products due to the decreased heat stability of the spread; hydrogenated hardstocks such as blends of rapeseed and soybean hardstocks are usually not included due to the decreased mouth cooling impact of the spread. These other fats and oils, either alone or by appropriate blending, can be included in the margarine fat in various amounts depending upon the properties desired in the spread. Normally, these other fats and oils are included in amounts of about 15% by weight or less and more typically in amounts of about 6% by weight or less.

b. Other oil phase ingredients.

Other ingredients can be presented in the oil phase. One particularly important ingredient is the emulsifier. Emulsifiers which can be used include mono- and diglycerides (water-in-oil stabilizers and baking aids), lecithin (oil-in-water stabilizer, as well as anti-stick and anti-spatter agent), and polyoxyethylene sorbitan monoesters such as TWEEN 60 and TWEEN 80 (oil-in-water stabilizers). Other conventional emulsifiers can also be used. The emulsifiers are added in amounts of from about 0.01 to about 10% by weight of the spread, and preferably in an amount of from about 0.1 to about 0.5% by weight. Coloring agents such as beta-carotene and oil soluble flavors can be in the oil phase. The amount of colors and flavors depends upon the color and flavor characteristics desired and is within the skill of the art.

2. Aqueous phase ingredients.

The aqueous phase usually contains milk or milk solids. The milk component can be derived from whole milk, low-fat milk (about 2% butterfat content), skim milk or nonfat dry milk solids. The amount of milk and/or milk solids (in terms of % by weight solids) usually ranges from about 0.5 to about 5% by weight of the emulsified spread, and more typically from about 1 to about 3% by weight. Particularly where milk solids are used, water, typically in the form of distilled or deionized water, is included as part of the aqueous phase. For a non-browning spread, the milk solids or reducing sugars in them are eliminated.

Other ingredients included within the aqueous phase are flavorants such as salt and other water-soluble flavors. Usually, salt is included in an amount of from about 0.5 to about 3.5% by weight of the emulsified spread, and more typically in an amount of from about 1 to about 2.5% by weight. The amount of the other water-soluble flavors depends upon the particular flavor characteristics desired.

Another important component of the aqueous phase are the preservatives, for example, citric acid, potassium sorbate and sodium benzoate. The preservatives are added in amounts effective to prevent oxidation, bacterial and mold growth.

B. Methods for making margarines and other emulsified spreads.

Figure 2:
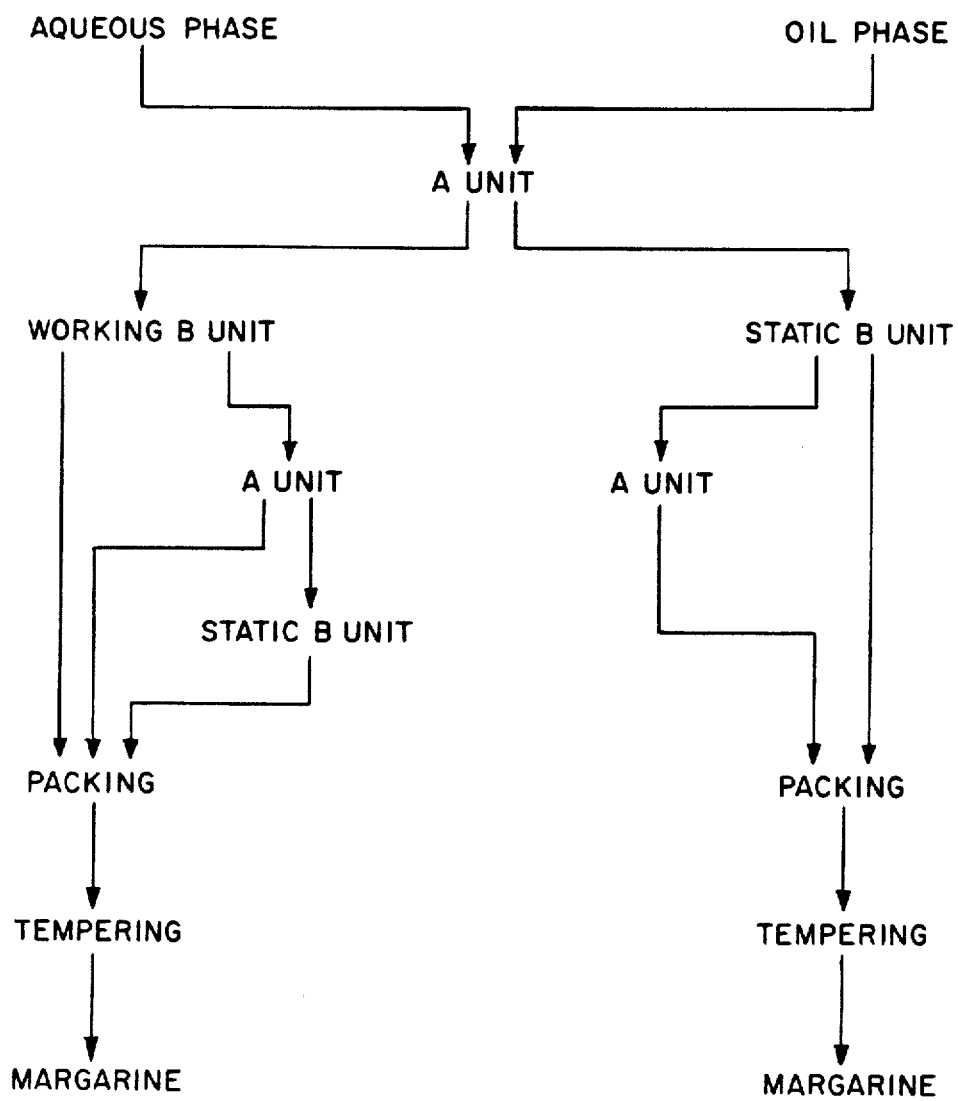
FIG. 2 represents a flow diagram of methods for making margarines and other emulsified spreads of the prsent invention.

Methods for making margarines and other emulsified spreads according to the present invention are shown in the flow diagram presented in FIG. 2. These methods involve blending the aqueous and oil phase ingredients and then chilling this mixture in a scraped-wall heat exchanger known as an A unit. After chilling, the emulsion is further crystallized in what is known as a B unit. The crystallized emulsion, with or without further chilling and crystallization in other A and B units, is packed and then tempered to provide a margarine, or other emulsified spread, having the desired properties. While the flow diagram in FIG. 2 shows several methods for forming margarines and other emulsified spreads according to the present application, other variations of A and B units and processing conditions can be employed depending upon the properties desired.

Referring more specifically to FIG. 2, the aqueous and oil phase ingredients can be formulated in separate mix tanks. The formulations from these mix tanks are metered out and the aqueous phase dispersed in the melted oil phase. If desired, the aqueous phase containing milk/milk solids can be dispersed in the oil phase and then the color, flavors and emulsifiers subsequently dispersed in this emulsion. This melted dispersion is then sent through one or more scraped-wall heat exchangers known as A units. These A units usually consist of a steel shaft rotating in a tube which is cooled externally by liquid ammonia or brine or other refrigerant. The rotating shaft is fitted with scraper blades which at high rotation speeds are pressed against the cooled inner surface. The high internal pressures and chilling action induce nucleation and crystallization of the emulsion in the A unit.

The rotator speed of the A unit usually ranges from about 100 to about 500 rpm. The emulsion is discharged from the A unit at a temperature of from about 15° F. to about 60° F. The hardness of the ultimately formed spread normally decreases as the emulsion is chilled to lower temperatures. The particular temperature to which the emulsion is chilled also depends upon the form of product. For the stick-type products of this invention, the temperature is from about 15° F. to about 45° F., and preferably from about 20° F. to about 35° F. Total residence time within the A unit or units is at least about 0.5 minutes and usually ranges from about 0.5 to about 2 minutes. Residence time within the A unit can be calculated by dividing the volume of the unit by the flow rate of the emulsion through the unit. Up to three A units are typically used to chill the emulsion.

The chilled emulsion from the A unit or units is then sent to a crystallizer known as a B unit. As shown in FIG. 2, the B unit can be either a static B unit or a working B unit. In the case of a static B unit, the crystallizer is usually in the form of a hollow pipe or resting tube, or else in the form of a motionless mixer. For a working B unit, the crystallizer is usually in the form of a picker box. A picker box typically consists of a large diameter tube having stator pins on the inner cylinder wall and a rotating shaft fitted with rotor pins. The combination of stator and rotor pins mechanically work the fat as it passes through the B unit so as to break up the fat crystals. The rotor usually rotates at speeds of from about 100 to about 1500 rpm.

For either a working or static B unit, the residence time of the emulsion (calculated as in the A units) is at least about 3 minutes for stick-type products. More typically, the residence time is from about 3 to about 5 minutes. For a working B unit, crystallization and work adds from about 10° F. to about 25° F. to the temperature of the emulsion. For a static B unit, crystallization adds from about 10° F. to about 20° F. to the temperature of the emulsion.

The crystallized emulsion is then either packed or else sent through an additional A unit or units to further chill the crystallized emulsion. When sent through this additional A unit or units, the crystallized emulsion is discharged at a temperature of from about 15° F. to about 40° F. For stick-type products, the temperature is from about 15° F. to about 40° F., and more preferably from about 20° F. to about 25° F. Total residence time within this additional A unit or units is at least about 0.2 minutes and usually ranges from about 0.2 to about 1 minutes. The chilled crystallized emulsion discharged from the additional A unit or units can either be packed or else sent through a static B unit (when previously crystallized in a working B unit) to provide additional crystallization time.

After crystallization, with or without further chilling, the margarine (or other emulsified spread) is then packed in either stick or tub form. The form in which the margarine is packed will frequently depend on how much the emulsion has previously been worked in the B units. For stick-type products, the margarine either can be extruded or molded into bars by techniques well known in the margarine art. The packed margarine is usually tempered at a temperature of from about 30° F. to about 50° F. for at least about 24 hours.

Methods for Measuring Properties of Margarine Products.

A. Mouth Texture.

Figure 3:
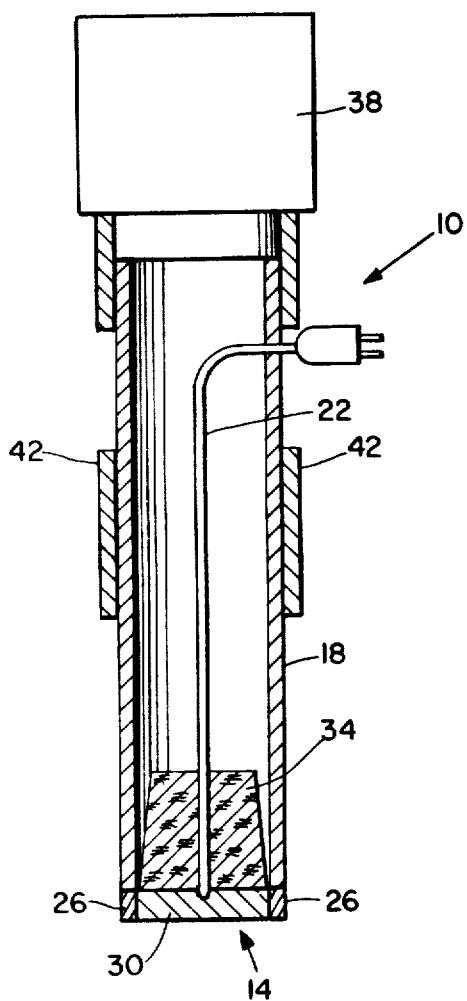
FIG. 3 represents a sectional side view of the Hot Probe used to measure the cooling impact of margarine products.

The mouth texture of a margarine in terms of cooling impact can be measured by use of a Hot Probe (HP) test. The instrument used to conduct the HP test is known as a Hot Probe and is shown as 10 in FIG. 3. Probe 10 consists basically of a sensing head 14, a non-thermally conducting body in the form of 1 in. diameter plastic cylindrical tube 18 and a thermocouple 22. The tip of thermocouple 22 is imbedded in the sensing head 14 which consists of a ¾ in. diameter copper ring 26 filled with lead solder 30. The thickness of solder 30 inside ring 26 is 5/32 in. The tip of thermocouple 22 is buried within solder 26 to a depth of 3/32 in.

To fabricate probe 10, thermocouple 22 is held in place by cork 34 while the reservoir created by the end of plastic tube 18 and ring 26 is filled with molten solder 30. When the solder solidifies, the tip of the thermocouple is permanently imbedded within it. The exposed surface of the solidified solder is filed smooth. Teflon tape (not shown) is wrapped over ring 26 and tube 18 to offer additional support. A weight 38 is added to the top of probe 10 to provide a total weight for the probe of 600 g. This particular weight was chosen so as to insure adequate contact between the probe and the margarine sample. The probe is supported by a brass pipe collar 42 of sufficient inside diameter to permit free movement of tube 18 while preventing lateral shifting. This collar 42 is held vertically in place by a ring stand (not shown) when probe 10 is ready for testing a margarine sample.

The HP test indicates the cooling effect in the mouth that occurs when a cool margarine (40° F.) is placed in contact with the tongue. Sensing head 14 of the probe is warmed to a temperature to approximate that of the mouth (95° F.) and then placed in contact with a cool sample pad of the margarine. The cool pad causes the temperature of sensing head 14 to decrease over time. This temperature decrease is sensed by thermocouple 22 and then recorded on chart paper of a recorder as a Hot Probe curve. This curve indicates the rate of heat loss from probe 10 to the sample pad.

In carrying out the HP test, sample pads from the margarine are formed. Sample preparation is done in a 40° F. constant temperature room so that the margarine does not melt. Samples for HP testing are in the form of 1¼ in. square by ¼ in. thick pads. The pads are cut with a stick cutter or a thin wire "cheese cutter". The cut pads are put in a square plastic petri dish and submerged in a 40° F. waterbath to insure thermal equilibrium.

Before the sample pads are tested, probe 10 is calibrated. Thermocouple 22 is connected to a chart recorder (Sargent-Welch Model No. XKR or equivalent). Probe 10 is then submerged in a waterbath which is at a temperature of 70° F. as determined by a thermometer. While stirring the bath, the pen of the recorder is zeroed to the proper position on the chart paper. This procedure is repeated in a waterbath having a temperature of 100° F., as determined by a thermometer. The variable span control is used to adjust the pen of the recorder to the proper position on the chart paper. This procedure is repeated until the recorder indicates the proper position on the chart paper of both the 70° F. and 100° F. baths with no further adjusting.

The HP test is performed by first removing the sample pad from the 40° F. bath and drying the pad off using a paper towel. The dry pad is then placed on the ring stand base below probe 10. The probe is submerged in a 120° F. waterbath until its temperature is approximately 100° F. as indicated by the recorder. The probe is then dried and inserted within collar 42 directly above the sample pad. When the recorder indicates 95° F. (chosen to approximate mouth temperature), the sensing head 14 of the probe is gently placed in contact with the pad to initiate the HP test. The entire HP test is conducted in a 70° F. constant temperature room. The temperature decrease over time of the sensing head is measured on the chart paper of the recorder as a Hot Probe curve.

Figure 4:
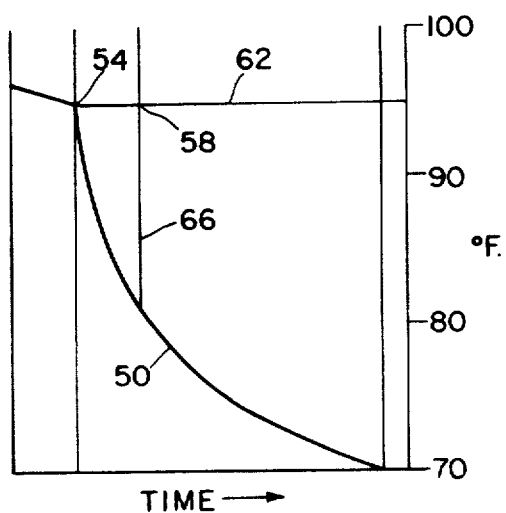
FIG. 4 represents a typical Hot Probe curve of a margarine containing a structural fat of the present invention.

A typical Hot Probe curve 50 for a margarine made with a structural fat of the present application is shown in FIG. 4. Point 54 on curve 50 represents the time at which the sensing head 14 of the probe was brought into contact with the pad. The distance from point 54 to point 58 along line 62 (95° F.) represents a 6 second time interval. Line 66, perpendicular from line 62 to curve 50, represents the temperature drop during the 6 second interval, in this case 14° F. Such Hot Probe values for 4 pads of each margarine are averaged to give a more representative indication of cooling impact. A Hot Probe value of greater than 11.3° F./6 sec. normally indicates a significant benefit in terms of cooling impact, preferably the value is 13 to 17.

The probe 10 can be calibrated by determining Hot Probe values for distilled water (water standard) and refined, bleached, deodorized and winterized soybean oil (oil standard). The probe is heated to 95° F. as previously described and then immersed about ⅛ of an inch deep into a 40° F. bath of the particular standard. The Hot Probe values for the water and oil standards should be 19.4° F./6 sec. and 9.8° F./6 sec., respectively.

B. Spreadability.

Figure 5:
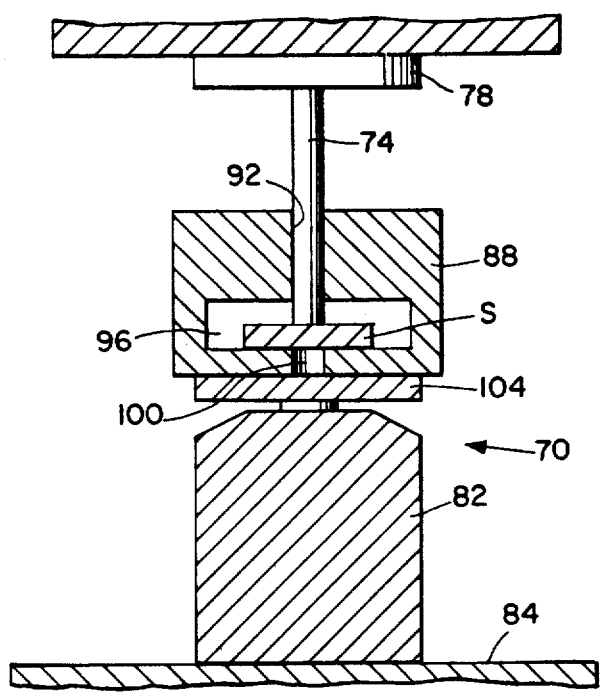
FIG. 5 represents a sectional side view of the Instron and related apparatus used to measure the Shear Stress of margarine products.

The spreadability of margarine products in terms of hardness can be measured by a shear stress (SS) test. The device used in the SS test is an Instron Universal Testing Machine (Model No. TMS) shown generally in FIG. 5 as 70. Instron 70 consists basically of a vertically movable cross head 78 and a 200 lb. compression load cell 82 (for measuring the force generated) mounted on base 84 of the Instron. Cross head 78 drives unconnected cylindrical punch 74 which is received by rectangular fixture 88. This fixture 88 has a cylindrical bore in the form of punch guide 92 for slidable movement of punch 74. A test chamber 96 is also formed in fixture 88 for receiving the sample pad S to be tested. Fixture 88 also has a cylindrical bore in the form of die 100 over which sample S sits.

The SS test measures the hardness of the margarine and thus is an indication of its spreadability. The downward movement of crosshead 78 pushes punch 74 against sample pad S. Pad S is put under shear jointly by the action of the tip of punch 74, and die 100 of fixture 88. Load cell 82 measures the force required to punch through pad S and records it as a force curve on chart paper of a recorder. The Shear Stress value of pad S is then calculated from this force curve.

In carrying out the SS test, sample pads from the margarine are formed. For stick-type products, sample pads ¼ in. thick by 1¼ in. square are cut using a thin wire cutter. The cut pads are then equilibrated at 40° F. by submergence in a constant temperature waterbath for at least 1 hour. For tub-type products, the product is gently removed from the tub and then cut into sticks having a 1¼ in. sq. cross section with a wire cutter. These sticks ae then cut into sample pads in the same manner as the stick-type products.

The SS test is conducted by placing sample pad S in test chamber 96 of fixture 88. Sample pad S is centered over die 100 of fixture 88. Fixture 88 with pad S is then placed on load plate 104 of load cell 82 and the load cell is then tarred. The full force scale of the Instron is calibrated by placing a known weight on load plate 104 of load cell 82 along with fixture 88 and pad S. The scale is set to provide maximum resolution for a given sample pad, usually 5 lbs. full scale. The Instron is then set at a cross head speed of 10 ipm and a chart speed of 10 ipm. The upper and lower limits of cross head 78 are set to determine the penetration depth and the return height, respectively. The SS test is initiated by bringing cross head 78 into its downward motion which pushes punch 74 through sample pad S. The chart paper of the recorder moves in concert with cross head 78 with the pen recording the Shear Stress force curve of the penetration.

Figure 6:
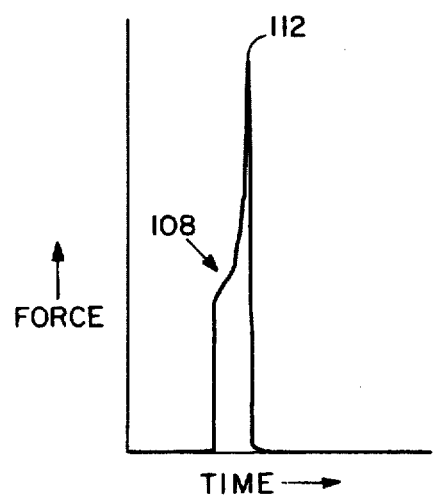
FIG. 6 represents a typical Shear Stress force curve of a margarine containing a structural fat of the present invention.
Figure 7C:
FIGS. 7a through 7i represent a Slump Chart used to evaluate the heat stability of margarine products.
Figure 7F:
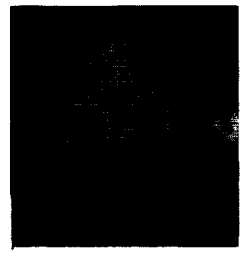
Figure 7I:
Figure 7B:
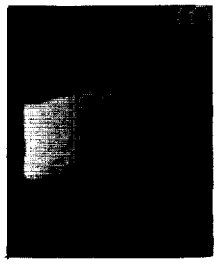
Figure 7E:
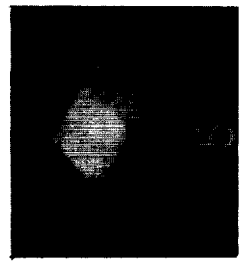
Figure 7H:
Figure 7A:
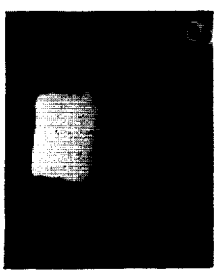
Figure 7D:
Figure 7G:
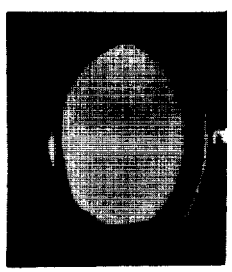

A typical Shear Stress force curve 108 for a margarine made with the structural fat of the present application is shown in FIG. 6. The height of curve 108 from the base thereof to the tip 112 indicates the amount of force (F) applied to the sample pad during the SS test, in this case about 1.3 lbs. The F values for 4 sample pads of the margarine are averaged for a representative indication of the amount of hardness. The shear stress value, $S_S$, is calculated by using the following formula:

$$S_S = F/(\pi D T)$$

wherein D = diameter of punch 74 and T = thickness of the sample pad

Because D = 0.5 in. and T = 0.25 in., the above formula reduces to the following: $S_S = 2.55 F$ An $S_S$ value of about 12 psi or less at 40° F. (based on the hardness of butter) indicates a margarine having acceptable hardness.

C. Heat Stability.

The heat stability of a margarine, in particular a stick-type product, can be determined by a Slump Grade (SG) test. The SG test measures, by visual inspection, the deformation of a sample due to melting when exposed to a warm environment (80° F.). At a specified time, the sample is compared to a Slump Chart (FIGS. 7a through 7i) to determine the Slump Grade.

The SG test is conducted by first preparing samples in the form of 1¼ in. cubes from margarines which have been stored in a 40° F. constant temperature room for at least 1 day. These samples are cut from the margarine by using a thin wire cutting device. The sample cubes are equilibrated to 40° F.

The sample cube is then placed in an 80° F. constant temperature room. Visual deformation measurements are taken at 30 minutes, 45 minutes and 1 hour. Deformation of the sample cube is determined by comparison to the Slump Chart shown in FIGS. 7a through 7i. A grade of 10 is the highest and represents no melting. A grade of 9 (FIG. 7a) represents the first indication of melting, while a grade of 0 (FIG. 7i) represents a completely melted sample cube. The Slump Grades of 3 sample cubes are averaged for each margarine to give a more representative measure of heat stability. A Slump Grade of about 8 or better (based on consumer testing) at 80° F. for 1 hour indicates a margarine having acceptable heat stability for a stick-type product.

D. Temperature Cycling Stability.

Temperature cycling is the exposure of a margarine to a temperature higher than the normal storage temperature for a specified period one or more consecutive times. The temperature cycling stability of the margarine can be measured by evaluating the mouth texture, spreadability and heat stability thereof after cycling. Stick-type margarine products are initially stored at a temperature of 40° F. On three consecutive days, the margarine is placed in an environment of 70° F. for 2 hours and then returned to the 40° F. environment. These conditions were selected to approximate temperature cycling by the consumer. After this temperature cycling, sample pads or cubes of the margarine are evaluated by the preceding HP, SS and SG tests. Hot Probe, Shear Stress and Slump Grade (for stick-type products) values satisfying the previously mentioned criteria after cycling of the margarine indicate a significant benefit in terms of temperature cycling stability.

Effects of Different Structural Fats, Different Levels of Structural Fat, Different Soft Oils, and Addition of Minor Amounts of Other Fats and Oils on Properties of Margarine Proeucts.

A. Structural Fats

The effects of different structural fats on the properties of margarine products were evaluated. The characteristics of three palm mid-fractions (PMF-1 to PMF-3) used as the structural fats in terms of SFC, Argentation, CNP and FAC values are as follows:

|  | PMF-1 | PMF-2 | PMF-3 |
|---|---|---|---|
| SFC |  |  |  |
| 50° F. | 74.8 | 74.3 | 71.6 |
| 70° F. | 45.7 | 39.6 | 33.4 |
| 80° F. | 27.8 | 23.6 | 17.9 |
| 92° F. | 11.8 | 9.3 | 6.3 |
| 105° F. | 2.5 | 2.6 | 0.8 |
| Argentation |  |  |  |
| SSS | 7.3 | 7.5 | 6.0 |
| SOS | 43.4 | 42.8 | 40.0 |
| SSO | 8.2 | 8.3 | 7.9 |
| SOO/SLS | 25.4 | 26.7 | 29.4 |
| Other | 15.7 | 14.7 | 16.7 |
| CNP |  |  |  |
| C48 | 9.5 | 7.9 | 8.4 |
| C50 | 48.1 | 45.1 | 43.7 |
| C52 | 26.9 | 32.2 | 32.3 |
| C54 | 7.4 | 8.7 | 8.2 |
| Other | 8.1 | 6.1 | 7.4 |
| FAC |  |  |  |
| Palmitic | 51.0 | 48.7 | 47.7 |
| Stearic | 5.2 | 5.3 | 5.1 |
| Oleic | 34.9 | 36.3 | 36.7 |
| Linoleic | 7.2 | 8.1 | 8.9 |
| Other | 2.7 | 1.6 | 1.6 |

The margarine fat basically consisted of the Palm Mid-Fractions and soybean oil. The margarines were formulated under similar processing conditions. The properties of these margarines (age of 10 to 17 days) are presented in the following Table:

| Structural Fat* | Hot Probe (°F./6 sec.) | 40° Shear Stress (psi) | 80° Slump Grade (at 1 hr.) |
|---|---|---|---|
|  |  | Uncycled |  |
| 46% PMF-1 | 17.4 | 5.5 | 7.8 |
| 42.5% PMF-2 | 14.6 | 4.8 | 9.5 |
| 42.5% PMF-3 | 18.1 | 4.0 | 9.5 |
|  |  | Cycled |  |
| 46% PMF-1 | 13.4 | 6.2 | 9.7 |
| 42.5% PMF-2 | 12.5 | 4.1 | 10** |
| 42.5% PMF-3 | 16.1 | 3.6 | 8.5 |

*Percentages are by weight of oil phase.
**Age of 24 days.

As can be seen from the above Table, margarines formulated from all of the palm mid-fractions had significant cooling impact (Hot Probe), an acceptable hardness (Shear Stress), and sufficient heat stability (Slump Grade) for stick-type products, even after temperature cycling.

B. Structural Fat Levels.

The effects of different levels of structural fat on the properties of margarine products were evaluated. The margarine fat basically consisted of a structural fat of the present application (PMF-1) at various levels with the remainder of the margarine fat consisting of soybean oil. The margarines were formulated under similar processing conditions. The properties of these margarines (age of 10 days) are presented in the following Table:

| PMF Level (%)* | Hot Probe (°F./6 sec.) | 40° Shear Stress (psi) | 80° Slump Grade (at 1 hr.) |
|---|---|---|---|
|  |  | Uncycled |  |
| 19 | 18.7** | 1.3 | 0 |
| 31 | 16.7 | 3.8 | 4.0 |
| 46 | 17.4 | 5.5 | 7.8 |
| 75 | 13.8 | 11.0 | 10 |
|  |  | Cycled |  |
| 19 | 14.4** | 1.3 | 0 |
| 31 | 15.3 | 3.7 | 5.0 |
| 46 | 13.4 | 6.2 | 9.7 |
| 75 | 10.2 | 16.0 | 10 |

*Percentages are by weight of oil phase.
**HP test performed without weight.

As shown by the above Table, margarines formulated with PMF-1 at levels of 31% by weight or lower had insufficient heat stability (Slump Grade) for stick-type products. As also shown by the above Table, the margarine formulated with PMF-1 at a level of 75% by weight had insufficient cooling impact (Hot Probe) and unacceptable hardness (Shear Stress) after temperature cycling. It is to be understood that the amounts of structural fat and soft oil which can be blended together to formulate margarines having significant cooling impact, acceptable hardness and sufficient heat stability, even after cycling, can depend upon the melting profile (SFC) and triglyceride composition (Argentation, CNP and FAC) of the particular structural fat as well as the particular margarine processing conditions.

C. Soft Oils.

The effects of different soft oils and hydrogenation thereof on the properties of margarine products were also evaluated. The margarine fats basically consisted of PMF-1 at 46% by weight of the oil phase, the remainder consisting of the various soft oils. The margarines were formulated under similar processing conditions. The properties of these margarines (age of 10 to 14 days) are presented in the following Table:

| Soft Oils | Hot Probe (°F./6 sec.) | 40° Shear Stress (psi) | 80° Slump Grade (at 1 hr.) |
|---|---|---|---|
| | | Uncycled | |
| Soybean | 17.4 | 5.5 | 7.8 |
| Sunflower | 14.6 | 4.5 | 8.3 |
| Hydrogenated Sunflower | 13.3 | 6.9 | 10 |
| Hydrogenated Cottonseed | 11.3 | 15.9 | 10 |
| | | Cycled | |
| Soybean | 13.4 | 6.2 | 9.7 |
| Sunflower | 11.3 | 4.9 | 10 |
| Hydrogenated Sunflower | 10.0 | 8.9 | 9.3 |
| Hydrogenated Cottonseed | 10.0 | 13.8 | 10 |

As can be seen from the above Table, margarines formulated with Soybean and Sunflower oil as the soft oil had significant cooling impact (Hot Probe), acceptable hardness (Shear Stress), and sufficient heat stability (Slump Grade) for stick-type products, even after temperature cycling. By contrast, the margarines formulated with the hydrogenated soft oils had unacceptable hardness (Hydrogenated Cottonseed), and insufficient cooling impact after cycling (Hydrogenated Cottonseed and Hydrogenated Sunflower).

D. Other Fats and Oils.

The effects of the addition of minor amounts of other fats and oils on the properties of margarine products were also evaluated. The margarine fats basically consisted of PMF-1 at 46% by weight of the oil phase, the remainder consisting of a major proportion of soybean oil, plus a minor amount of the various other fats or oils. The margarines were formulated under similar processing conditions. The properties of these margarines (age of 10 to 14 days) are presented in the following Table:

| Added Fat or Oil* | Hot Probe (°F./6 sec.) | 40° Shear Stress (psi) | 80° Slump Grade (at 1 hr.) |
|---|---|---|---|
| | | Uncycled | |
| Control** | 17.4 | 5.5 | 7.8 |
| 6% Palm Oil | 14.7 | 5.1 | 9.7 |
| 12.5% Hydrogenated Coconut Oil | 16.1 | 6.0 | 6.3 |
| 4% Fix-X | 8.9 | 3.7 | 10 |
| | | Cycled | |
| Control | 13.4 | 6.2 | 9.7 |
| 6% Palm Oil | 12.1 | 5.6 | 9.0 |
| 12.5% Hydrogenated | 13.9 | 7.4 | 6.7 |

| Added Fat or Oil* | Hot Probe (°F./6 sec.) | 40° Shear Stress (psi) | 80° Slump Grade (at 1 hr.) |
|---|---|---|---|
| Coconut Oil | | | |
| 4% Fix-X*** | 9.0 | 1.3 | 10 |

*Percentages are by weight of oil phase.
**Soybean Oil only.
***mixture of 96% rapeseed and 4% soybean hardstocks.

As shown by the above Table, the margarines formulated with 6% Palm Oil had significant cooling impact (Hot Probe), acceptable hardness (Shear Stress), and sufficient heat stability (Slump Grade) for stick-type products, even after temperature cycling. By contrast, the margarine formulated with 12.5% Hydrogenated Coconut Oil had insufficient heat stability for a stick-type product. Also, the margarine formulated with 4% Fix-X (rapeseed/soybean hardstock) had insufficient cooling impact.

Effects of Processing Conditions on Properties of Margarine Products.

The effect of processing conditions on the properties of margarine products were evaluated. The first system involved chilling the emulsion in an A unit, followed by crystallization of the chilled emulsion in a static B unit. The flow rate (hence residence time) and outlet temperature of the A unit were varied. The margarine fats used basically consisted of PMF-1 at 46% by weight of the oil phase, the remainder consisting of soybean oil. The properties of these margarines (age of 10 to 14 days) are presented in the following Table:

| | Processing Conditions | | | | |
|---|---|---|---|---|---|
| Flow Rate (Lbs/min.) | Outlet Temp. (°F.) | Hot Probe (°F./6 sec.) | 40° Shear Stress (psi) | 80° Slump Grade (at 1 hr.) |
| | | | | Uncycled | |
| 1.0 | 20 | 13.2 | 10.9 | — |
| 1.0 | 40 | 11.9 | 11.5 | 10 |
| 0.6 | 20 | 13.7 | 11.6 | 9 |
| 0.6 | 40 | 13.8 | 12.1 | 10 |
| | | | | Cycled | |
| 1.0 | 20 | 13.0 | 4.1 | — |
| 1.0 | 40 | 11.3 | 7.6 | 10 |
| 0.6 | 20 | 12.0 | 6.1 | 10 |
| 0.6 | 40 | 11.8 | 7.1 | 9.5 |

As shown by the above Table, the margarines formulated under the various processing conditions of the first system had significant cooling impact (Hot Probe), acceptable hardness (Shear Stress), and sufficient heat stability (Slump Grade) for stick-type products, even after temperature cycling.

The second system involved chilling the emulsion in an A unit, crystallizing the chilled emulsion in a working B unit, and then chilling the crystallized emulsion in an additional A unit. The flow rate (hence residence time) and the outlet temperature of the first A unit were varied. The outlet temperature of the second A unit was kept constant at about 40° F. The margarine fats consisted basically of PMF-1 at 46% by weight of the oil phase, the remainder consisting of soybean oil. The properties of these margarines (age of 10 days) are presented in the following Table:

| Processing Conditions | | | | | 
|---|---|---|---|---|
| Flow rate (Lbs/min.) | Outlet Temp. (°F.) | Hot Probe (°F./6 sec.) | 40° Shear Stress (psi) | 80° Slump Grade (at 1 hr.) |
| Uncycled | | | | |
| 1.0 | 40 | 15.0 | 10.8 | 8.5 |
| 1.0 | 25 | 15.0 | 11.9 | 9.0 |
| 0.6 | 25 | 14.0 | 11.4 | 10 |
| 0.6 | 40 | 16.0 | 10.3 | 8.7 |
| Cycled | | | | |
| 1.0 | 40 | 12.2 | 2.8 | 9.0 |
| 1.0 | 25 | 12.2 | 5.8 | 9.0 |
| 0.6 | 25 | 12.1 | 5.4 | 9.5 |
| 0.6 | 40 | 12.7 | 7.0 | 9.0 |

As shown by the above Table, the margarines formulated under the various processing conditions of the second system had significant cooling impact (Hot Probe), acceptable hardness (Shear Stress), and sufficient heat stability (Slump Grade) for stick-type products, even after temperature cycling.

Comparison of Margarine Products of the Present Application to Butter, Commercial Margarines and Margarines Containing Different Margarine Fats.

A. Butter and Commercial Margarines.

The properties of a margarine product of the present application were compared to butter and commercial margarines. The properties of this margarine product (46% PMF-1 by weight of the oil phase, the remainder of the margarine fat consisting of soybean oil), butter (B) and three commercial margarines (CM-1 to CM-3) are presented in the following Table:

| Product | Hot Probe (°F./6 sec.) | 40° Shear Stress (psi) | 80° Slump Grade (at 1 hr.) |
|---|---|---|---|
| Uncycled | | | |
| PMF-1 | 17.4 | 5.5 | 7.8 |
| B | 11.8 | 11.0 | 10 |
| CM-1 | 10.4 | 4.5 | 10 |
| CM-2 | 10.5 | 3.0 | 10 |
| CM-3 | 9.9 | 1.7 | 10 |
| Cycled | | | |
| PMF-1 | 13.4 | 6.2 | 9.7 |
| B | 11.8 | 14.6 | 10 |
| CM-1 | 10.6 | 3.1 | 10 |
| CM-2 | 9.7 | 1.1 | 10 |
| CM-3 | 9.4 | 1.0 | 10 |

As shown by the above Table, the PMF-1 margarine compared favorably to butter (B), especially in terms of cooling impact (Hot Probe). In particular, butter had unacceptable hardness (Shear Stress) after temperature cycling. As also shown by the above Table, commercial margarines CM-1 to CM-3 had an insufficient cooling impact.

B. Other Margarine Fats.

The properties of a margarine product of the present application (46% PMF-1 by weight of the oil phase, the remainder of the margarine fat consisting of soybean oil) were also compared to margarines formulated from different margarine fats. These other margarine fats consisted basically of different structural fats with the remainder thereof consisting of soybean oil. The PMF-1 and other margarine fats were formulated into margarines under similar processing conditions. The properties of these margarines (age of 7 to 14 days) are presented in the following Table:

| Product* | Hot Probe (°F./6 sec.) | 40° Shear Stress (psi) | 80° Slump Grade (at 1 hr.) |
|---|---|---|---|
| Uncycled | | | |
| 46% PMF-1 | 17.4 | 5.5 | 7.8 |
| 46% Palm Oil | 15.7 | 4.7 | 6.0 |
| 75% 1st Palm Olein** | 17.7 | 4.6 | 0 |
| 46% Randomized Palm Oil | 15.0 | 2.6 | 10 |
| 46% Hydrogenated 2d Palm Olein*** | 9.2 | 2.3 | 10 |
| 46% Cocoa Butter | 14.4 | 3.0 | 9.0**** |
| 46% Cocoa Butter Substitute | 14.6 | 2.7 | 9.0**** |
| 46% Hydrogenated Coconut Oil | 16.8 | 5.9 | 8.0***** |
| Cycled | | | |
| 46% PMF-1 | 13.4 | 6.2 | 9.7 |
| 46% Palm Oil | 15.3 | 3.9 | 5.3 |
| 75% 1st Palm Olein** | 18.1 | 5.1 | 0 |
| 46% Randomized Palm Oil | 10.9 | 1.1 | 10 |
| 46% Hydrogenated 2d Palm Olein*** | 9.6 | 1.6 | 10 |
| 46% Cocoa Butter | 12.7 | 5.4 | — |
| 46% Cocoa Butter Substitute | 12.4 | 5.6 | — |
| 46% Hydrogenated Coconut Oil | 14.2 | 1.5 | 7.0***** |

*Percentages are by weight of oil phase.
**1st liquid fraction from thermally fractionated palm oil.
***Hydrogenated 2d liquid fraction from thermally fractionated palm oil.
****Age of 1 day.
*****Age of 28 days.

As shown by the above Table, the PMF-1 margarine compared favorably with the margarines made from Randomized Palm Oil, Cocoa Butter and Cocoa Butter Substitute, especially in terms of cooling impact (Hot Probe), even after temperature cycling. By contrast, the margarines made from Palm Oil or 1st Palm Olein had insufficient heat stability (Slump Grade) for stick-type products. As also shown by the above Table, the margarine made from Hydrogenated 2d Palm Olein had insufficient cooling impact while the margarine made from Hydrogenated Coconut Oil had insufficient heat stability for stick-type products after cycling.

Specific Embodiments of Methods for Making Structural Fat and Margarine Products According to the Present Application.

The following are specific embodiments which illustrate methods for making structural fats and margarine products according to the present application:

A. Structural fat.

Embodiment 1

One method for making a structural fat is as follows: Sixty-eight hundred g. of whole RBD palm oil (IV of 53.8) was placed in a glass fractionation column having a length of about 30 inches and an inside diameter of about 6 inches. This column had a jacket for circulation of a mixture of water-propylene glycol to heat and cool the palm oil. The palm oil was heated to a temperature of 170° F. under agitation by an impeller rotating at 11 rpm for about 0.5 hours. The heated oil was slowly cooled to 80° F. at a rate of 12.6° F./hr. under agitation of the impeller rotating at 11 rpm. The temperature of the cooled oil was maintained at 80° F. for 16 hours with no agitation. The solid crystals forming the stearine fraction were filtered out with a Buchner funnel. A vacuum of 28 to 29 inches of mercury was applied to the funnel.

The yield of the stearine fraction was about 20% by weight. This stearine fraction had an IV of 43.7. The triglyceride composition of this stearine fraction is presented in the following Table:

| Fatty Acid Composition | | Carbon No. Profile | |
|---|---|---|---|
| Fatty Acid | % | Carbon No. | % |
| palmitic | 51.4 | 48 | 18.0 |
| stearic | 5.2 | 50 | 36.0 |
| oleic | 33.4 | 52 | 27.7 |
| linoleic | 8.0 | 54 | 8.7 |
| Other | 2.0 | Other | 9.6 |

A first olein fraction was filtered off from the stearine fraction. The yield of this olein fraction was about 80% by weight. This olein fraction had an IV of 57.3. The triglyceride composition of this olein fraction is presented in the following table:

| Fatty Acid Composition | | Carbon No. Profile | |
|---|---|---|---|
| Fatty Acid | % | Carbon No. | % |
| palmitic | 39.3 | 48 | 3.9 |
| stearic | 4.5 | 50 | 36.4 |
| oleic | 42.9 | 52 | 36.5 |
| linoleic | 10.8 | 54 | 11.2 |
| Other | 2.5 | Other | 12.0 |

After filtering, the first olein fraction was again placed in the fractionation column, and heated to a temperature of 150° F. under agitation by the impeller rotating at 11 rpm for about 0.5 hours. The heated olein fraction was then slowly cooled to a temperature of 60° F. at a rate of 14.2° F./hr. under agitation of the impeller rotating at 11 rpm. The temperature of the cooled first liquid fraction was maintained at 60° F. for 16 hours with no agitation. The solid crystals forming the desired palm mid-fraction were filtered out as in the first filtration.

The yield of the palm mid-fraction (based on whole palm oil) was about 13% by weight. This palm mid-fraction had an IV of 44.9. The triglyceride composition of this palm mid-fraction is presented in the following Table:

| Fatty Acid Composition | | Carbon No. Profile | |
|---|---|---|---|
| Fatty Acid | % | Carbon No. | % |
| palmitic | 50.7 | 48 | 5.9 |
| stearic | 5.5 | 50 | 52.7 |
| oleic | 35.2 | 52 | 27.3 |
| linoleic | 6.9 | 54 | 6.5 |
| Other | 1.7 | Other | 7.6 |

A second olein fraction was filtered off from the palm mid-fraction. The yield of this olein fraction (based on whole palm oil) was about 65% by weight. This olein fraction had an IV of 60.4. The triglyceride composition of this olein fraction is presented in the following Table:

| Fatty Acid Composition | | Carbon No. Profile | |
|---|---|---|---|
| Fatty Acid | % | Carbon No. | % |
| palmitic | 37.4 | 48 | 2.3 |
| stearic | 4.3 | 50 | 32.3 |
| oleic | 44.8 | 52 | 43.0 |
| linoleic | 11.8 | 54 | 13.4 |
| Other | 1.7 | Other | 9.0 |

EMBODIMENT 2

Another method for making a structural fat is as follows: Ten separate 360 to 390 lb. quantities of whole RBD palm oil are heated to a temperature of about 150° F. until melted. The melted quantities of palm oil are slowly cooled (without agitation) by holding at ambient temperatures for about 12 hours. The cooled quantities of oil are then held (without agitation) at about 80° F. for about 48 hours to crystallize out the stearine fraction. The stearine fraction is then separated from the first olein fraction for each quantity of oil by using a rotary drum filter.

The first olein fraction in separate 375 to 410 lb. quantities is heated to a temperature of about 150° F. until essentially crystal free. The heated quantities of olein fraction are slowly cooled (without agitation) by holding at ambient temperatures for about 12 hours. The cooled quantities of olein fraction are held (without agitation) at about 70° F. for about 24 hours, are then held (without agitation) at about 60° F. for about 24 hours, and are further held (without agitation) at about 70° F. for about 24 hours to crystallize out the palm mid-fraction. The palm mid-fraction is then separated from the second olein fraction using a rotary drum filter and centrifuge. This palm mid-fraction can be used after deodorization as a structural fat.

B. Margarine Oil Products.

A margarine oil product was made by blending a structural fat prepared by double thermal fraction of palm oil with soybean oil. The blend is heated to about 150° F. to melt the structural fat.

The fat designated PMF-1 was used. A 46% mixture of PMF-1 with 54% soybean oil has the following Solids Fat Content:

| Temperature | % Solids By Weight |
|---|---|
| 50° F. | 29.9 |
| 70° F. | 15.0 |
| 80° F. | 7.0 |
| 92° F. | 3.2 |
| 105° F. | 0.8 |

The P:St ratio is 6.6.
The O-L ratio is 0.94.

C. Margarine products.

EMBODIMENT 1

A margarine was formulated from standard margarine aqueous phase ingredients (water, milk solids, salt, preservatives) dispersed in an oil phase containing the margarine fat of the present application (46% by weight palm mid-fraction, remainder soybean oil), plus other oil phase ingredients (mono-, di-glyceride and soybean lecithin emulsifiers, beta-carotene, flavors). The aqueous phase formed about 20% by weight of the total emulsion; the oil phase formed about 80% by weight.

The melted dispersion (temperature of about 120° F.) of aqueous and oil phase ingredients was sent through an A unit of the Votator-type. The flow rate was such as to provide about 1 minute residence time in the A unit. The mutator speed of the A unit was 150 rpm. The water-in-oil emulsion was discharged from the A unit at a temperature of from 16° to 26° F.

The chilled emulsion from the A unit was sent through a motionless mixer B unit. The residence time within the B unit was about 3 to 5 minutes. The crystallized emulsion picked up 10° to 15° F. of heat during crystallization. The crystallized emulsion was discharged from the static B unit and then stored at 40° F. This product after cycling has a Hot Probe value of 12° F./6 sec. and a slump grade of 10.

EMBODIMENT 2

A margarine was formulated from aqueous and oil phase ingredients the same as those of Embodiment 1. The melted dispersion (temperature of about 120° F.) of aqueous and oil phase ingredients was sent through two A units in series of the Votator-type. The A units provided a combined residence time of about 1.6 minutes. The mutator speeds of the A units were 250 rpm and 180 rpm, respectively. The water-in-oil emulsion was discharged from the second A unit at a temperature of from 17° to 27° F.

The chilled emulsion from the second A unit was sent through a working B unit of the Votator type. This working B unit provided a residence time for the chilled emulsion of about 3.8 minutes. The shaft speed of the working B unit was 260 rpm. The crystallized emulsion in the working B unit picked up crystallization heat such that the margarine was discharged at a temperature of from 44° to 48° F.

The crystallized emulsion from the working B unit was then sent through an additional A unit of the Votator type. The residence time of the crystallized emulsion in this additional A unit was about 0.7 minutes. The mutator speed of this additional A unit was 150 rpm. The crystallized emulsion was discharged from this additional A unit at a temperature of from 22° to 28° F. The chilled crystallized emulsion from this additional A unit was extruded into a stick-type margarine product and then stored at 40° F.

When this margarine is used to prepare a cake, the cake has no gum lines and is higher than cakes prepared from commercially available margarines.

What is claimed is:

1. An edible water-in-oil emulsion spread, which comprises:
   (1) an aqueous phase; and
   (2) an oil phase comprising a margarine oil product having:
      (A) from about 30% to about 65% by weight of a soft oil; and
      (B) from about 35% to about 70% by weight phase of a structural fat consisting of:
         (a) from about 3% to about 9% by weight SSS triglycerides;
         (b) from about 32% to about 50% by weight SOS triglycerides;
         (c) from about 5% to about 12% by weight SSO triglycerides; and
         (d) from about 20% to about 32% by weight SOO/SLS triglycerides,
   wherein S=saturated $C_{16}$ or $C_{18}$ fatty acid residue, O=oleic acid residue, and L=linoleic acid residue; said fat having a weight ratio of P:St acid residues attached to the glycerides of greater than 8.5 and a weight ratio of O:L acid residues of from about 4 to about 5, wherein P=palmitic, St=stearic, O=oleic, and L=linoleic, wherein said spread has a slump grade of at least 8 after 1 hour at 80° F. and a Hot Probe value of at least about 11.3° F./6 sec.

2. A spread according to claim 1 which is margarine wherein said aqueous phase is in an amount of up to about 20% by weight of the spread and wherein said oil phase is in an amount of at least about 80% by weight of the spread.

3. A margarine according to claim 2 wherein said margarine oil product has a Solid Fat Content of:
   (a) from about 17 to about 54% at 50° F.;
   (b) from about 6 to about 33% at 70° F.;
   (c) from about 4 to about 16% at 80° F.;
   (d) from about 2 to about 7.5% at 92° F.; and
   (e) less than about 2% at 105° F.

4. A margarine according to claim 3 wherein said soft oil is in an amount of from about 45 to about 60% by weight and wherein said structural fat is in an amount of from about 40 to about 55% by weight.

5. A margarine according to claim 4 wherein said soft oil has a solid fat content of: (a) about 1% or less at 50° F.; and (b) 0% at 70° F.

6. A margarine according to claim 4 wherein said soft oil is selected from the group consisting of soybean oil, safflower oil, sunflower oil, and mixtures thereof.

7. A margarine according to claim 6 wherein said soft oil is soybean oil.

8. A method for making an edible water-in-oil emulsion spread, which comprises the steps of:
   (1) providing an aqueous phase and an oil phase comprising a margarine fat having from about 30 to about 65% by weight of the oil phase of a soft oil and from about 35 to about 70% by weight of the oil phase of a structural fat consisting of:
      (i) from about 3% to about 9% by weight SSS triglycerides;
      (ii) from about 32% to about 50% by weight SOS triglycerides;
      (iii) from about 5% to about 12% by weight SSO triglycerides; and
      (iv) from about 20% to about 32% by weight SOO/SLS triglycerides;
   wherein S=saturated $C_{16}$ or $C_{18}$ fatty acid residue, O=oleic acid residue, and L=linoleic acid residue; having a weight ratio of P:St acid residues attached to the glycerides of from about 9 to about 10 and a weight ratio of O:L acid residues of from about 4 to about 5, wherein P=palmitic, St=stearic, O=oleic and L=linoleic;
   said margarine oil product having
      (a) a Solid Fat Content of:
         (i) from about 17 to about 54% at 50° F.;
         (ii) from about 6 to about 33% at 70° F.;
         (iii) from about 4 to about 16% at 80° F.;
         (iv) from about 2.0 to about 7.5% at 92° F.; and
         (v) less than 2% at 105° F.;
      (b) a Fatty Acid Composition having a weight ratio of P:St acid residues attached to the glycerides of about 3.4 to about 7.5 and a weight ratio of O:L acid residues of about 0.4 to about 2.4, wherein P=palmitic, St=stearic, O=oleic and L=linoleic;
   (2) mixing the aqueous phase with the oil phase to form an emulsion;
   (3) chilling the emulsion to a temperature of from about 15° F. to about 45° F. over a time period of at least about 0.5 minutes; and (4) crystallizing the chilled emulsion over a time period of at least about 3 minutes.

9. A method according to claim 8 for making a margarine wherein the aqueous phase is in an amount of up to about 20% by weight of the spread and wherein the oil phase is in an amount of at least about 80% by weight of the spread.

10. A method according to claim 9 wherein the time period of step (4) is from about 3 to about 5 minutes.

11. A method according to claim 10 wherein the time period of step (3) is from about 0.5 to about 2 minutes.

12. A method according to claim 11 wherein the emulsion is chilled in step (3) to a temperature of from about 20° F. to about 35° F.

13. A method according to claim 9 which comprises the further step of: (5) chilling the crystallized emulsion after step (4) to a temperature of from about 15° F. to about 40° F. over a time period of at least 0.2 minutes.

14. A method according to claim 13 wherein the crystallized emulsion is chilled in step (5) to a temperature of from about 20° F. to about 25° F.

15. A method according to claim 14 wherein the crystallized emulsion is chilled in step (5) over a time period of from about 0.2 to about 1 minutes.

16. A method according to claim 9 wherein the soft oil is in an amount of from about 45% to about 60% by weight and wherein the structural fat is in an amount of from about 40% to about 55% by weight.

17. A method according to claim 16 wherein the soft oil is selected from the group consisting of soybean oil, safflower oil, sunflower oil, and mixtures thereof.

18. A method according to claim 17 wherein the soft oil is soybean oil.

* * * * *